INVENTOR.
Norton Lesser

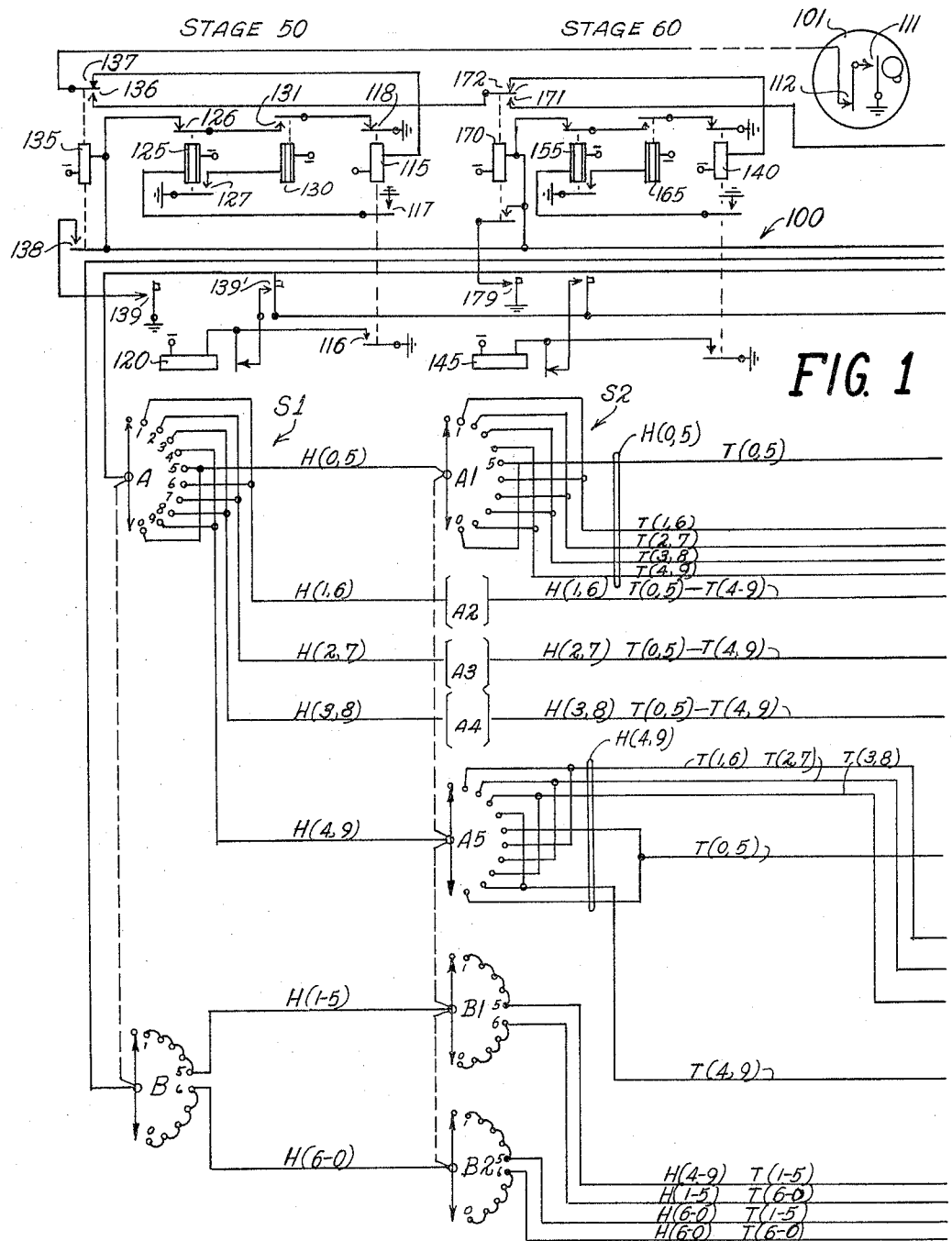

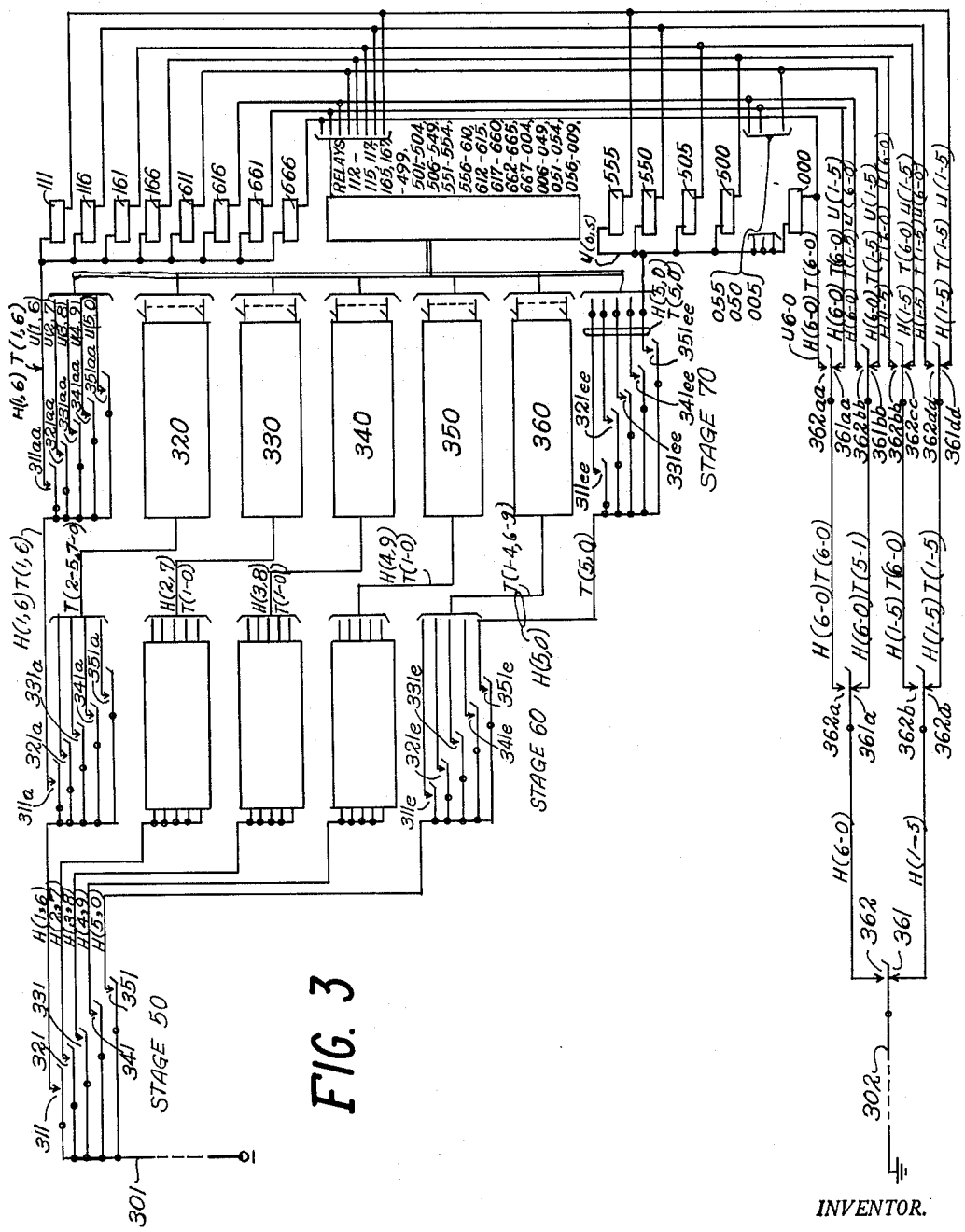

United States Patent Office 3,239,812
Patented Mar. 8, 1966

3,239,812
PLURAL ORDER SELECTING SYSTEM RESPONSIVE TO A PLURAL DIGIT NUMBER
Norton Lesser, 648 Burton Ave., Highland Park, Ill.
Filed Mar. 8, 1961, Ser. No. 94,183
4 Claims. (Cl. 340—147)

This invention relates in general to a counting or registering arrangement and more particularly an improved arrangement for selecting one among many possible devices or electrical outlets responsive to the receipt of a plurality of impulses.

The type of problem which the present invention attacks may be appreciated from a consideration of the principles normally applied in providing a selection of one device among, for example, a thousand. Such a selection is usually made responsive to a number of respective series of input pulses representing a three digit number assigned a desired device or outlet. As is often practiced in the telephone and/or other industries a series of switches arranged in tandem are operated responsive to the receipt of a respective series of pulses respresenting the hundredths, tens and units digits respectively of the three digit number. Each switch has a wiper which is stepped or moved to a position corresponding to the number of impulses in a respective series. Thus a first switch wiper is stepped to any one of ten positions each representing a different hundredths or first digit. A contact at each of these positions is extended to a respective second switch wiper corresponding to the respective hundredths digit and each of the latter wipers also has access to ten contacts. Ten such second switch wipers are therefore provided in addition to the first wiper and its ten contacts. The selected second switch wiper is operated responsive to a series of impulses corresponding to the tens digit to select one of ten other switch wipers to which it has access. As each tens switch wiper has access to ten such other switch wipers, a total of 100 other switch wipers is provided. The selected other switch wiper is operated responsive to the receipt of a series of pulses corresponding to the units digit to select one of ten positions to which it has access. A contact at the last selected position and electrically connected to a desired output device which is assigned a digit value corresponding to the pulses in the respective hundredths, tens and units series then extends a potential for operating the device.

The just described arrangement may be simplified to some extent by two motion switches, for example, in which one switch has access to 100 positions and is operated responsive to two series of impulses and has been utilized in other versions as, for example, a relay matrix. In a relay matrix arranged to select one of a 1000 outlets, the contacts of three groups of ten relays each have their contacts cross connected in progressively expanded contact trees, but the number of contacts are essentially the same as described. This relay type of arrangement is often used in register translators in which one relay in each of the three groups and corresponding to a respective hundredths, tens and units digits is operated responsive to pulses in the respective series. Thus one relay corresponding to a particular hundredths digit in a first group, is operated to extend a connection to one of ten contacts on each relay in the second group of ten relays each corresponding to a different tens digit. Each of ten relays in the second group has ten contacts and on operation of the one relay corresponding to the particular tens digit it extends the connection to one contact on each relay in the third group. Each of ten relays in the third group is therefore provided with a hundred contacts so that the last group has 1000 contacts. On operation of the relay corresponding to the particular units digit in the last or units group, the connection is extended to the desired output device. It will thus be seen that whether switches or a relay matrix is used, the number of contacts generally provided to enable the selection of any one outlet among 1000 equals 1110 contacts, if only one circuit is to be extended. Of course under many circumstances it is not necessary to employ the full contact three or the full number of switch wipers and bank contacts, as the number depends on the number of selections, but as a rule, if any digit used can be combined with each of nine other digits in the other digit orders, the complete arrangement has to be provided.

Other arrangements for reducing the number of required contacts have been devised in which the connections are extended in multiple to the desired output device from each selected hundredths, tens and units position respectively. But this requires that circuits be completed for selecting at least one device in respective groups of ten devices and that another selection be based on selecting one of the groups. This arrangement has therefore failed to achieve much success, as the large number of circuits which must be completed to enable a selection to be made, results in an excessive and uneconomical power drain.

This invention therefore has for one primary object a reduction in the number of contacts by which a single selection is made of a plurality of different output devices or circuits responsive to the receipt of a plurality of impulses or digits to thereby reduce the necessary labor and wiring.

In brief, this is accomplished by making a selection corresponding to a number of combinations of alternative hundredths, tens and units digits and a simultaneous selection corresponding to one group of hundredths, tens and units digits which are individual to one of said combinations. Thus instead of extending a connection individual to each received digit, a connection corresponding to each of two alternative digits is extended for each received digit so that a terminating connection is provided that corresponds to any combination of the two alternative digits in each digit order. Each terminating connection therefore represents a number of combinations corresponding to two raised to a power corresponding to the number of received digits. If three digit orders are used to permit a selection of one among 1000 outlets, each terminating connection corresponds to eight different output devices and therefore 125 such terminating connections are provided. Each of the eight output devices represents a respective one of the combination of alternative digits in their respective digit orders that selected the particular terminating connection. The alternative digits are chosen as 1 or 6, 2 or 7, 3 or 8, 4 or 9, and 5 or 0 although other combinations may just as easily be used.

A simultaneous selection is also made of the group 1–5 or 6–0 for each received digit and that selection extended in a binary manner for the respective digit orders so that eight other terminating connections each corresponding to a different one of eight possible groups of hundredths, tens and units digits are also used. Each is connected to a respective one of the eight output devices in each group of eight to which the respective 125 first terminating connections are extended Thus a connection corresponding to alternate combinations of the respective digits and a connection corresponding to the group value of one of the combinations and including the desired digit combination is selected and only the one output device connected across both connections and assigned the required digit value, is operated.

It may thus be seen that the invention employs the principal of selecting for each impulse series, a pair of digit values and one of a pair of alternate group values to which one of the pair of digit values corresponds. It will subsequently become apparent that the invention is applicable to both arrangements wherein the pulses are received in a separate series for each digit order or are received sequentially.

Since electronic decade counters or shift registers utilize one stage for registering each digit value, so that if any one of ten digits must be registered at least ten stages must be provided for each digit order, this principle may also be advantageously applied to such electronic counters. It thus becomes possible to reduce the number of stages necessary to register the ten different digits in each digit order. As such stages are each considerably more expensive than contacts, it will be immediately appreciated that any savings in the number of necessary stages has important economic consequences. Accordingly it is another object of this invention to enable the registration of varous digits and/or the selection of one among a plurality of output terminals by means of electronic or static devices by arranging said devices to register both alternate digit values and a group value including only one of said digit values.

It will be apparent from the above that the principle of the invention is applicable to the situation wherein pulses in any one of a plurality of different digit orders are received in successive series or are received in sequence or are received at random wherefore it is another object of the present invention to apply the above principle to registering and/or selection systems wherein the signals or impulses in respective digit orders are registered successively; are registered sequentially or are registered at random or in parallel.

It is also be appreciated that the principle of the invention is actually applicable to any type of selecting system for selecting one among $n$ output devices by arranging the devices in a matrix with $n/2^y$ devices in each row and $2^y$ devices in each column where $y$ is the number of digit orders in $n$. Selecting one row and one column enables a particular output device at the crosspoint to be operated.

It will also be appreciated that the principle of the invention is capable of reducing the number of contacts usually utilized in multiple level switches wherein each position at each level may be used to extend a respective circuit.

Since the invention in its basic concept employs a principle which is applicable to different types of systems, it is also an objective of the invention to provide a selection system which may be easily modified to accommodate different operating needs.

The broad objectives of the invention having been recited, other objects together with the features of this invention will become apparent on examination of the following specifications, claims and drawings; wherein FIGS. 1 and 1a illustrate a simplified circuit arrangement employing stepping switches for practicing the principles of the present invention.

FIG. 3 illustrates one type of circuit arrangement that may be employed with the cams shown in FIG. 2.

FIG. 5 illustrates one circuit arrangement employing electronic devices such as tubes, transistors or magnetic cores for practicing the principles of the present invention.

Figure 1A:
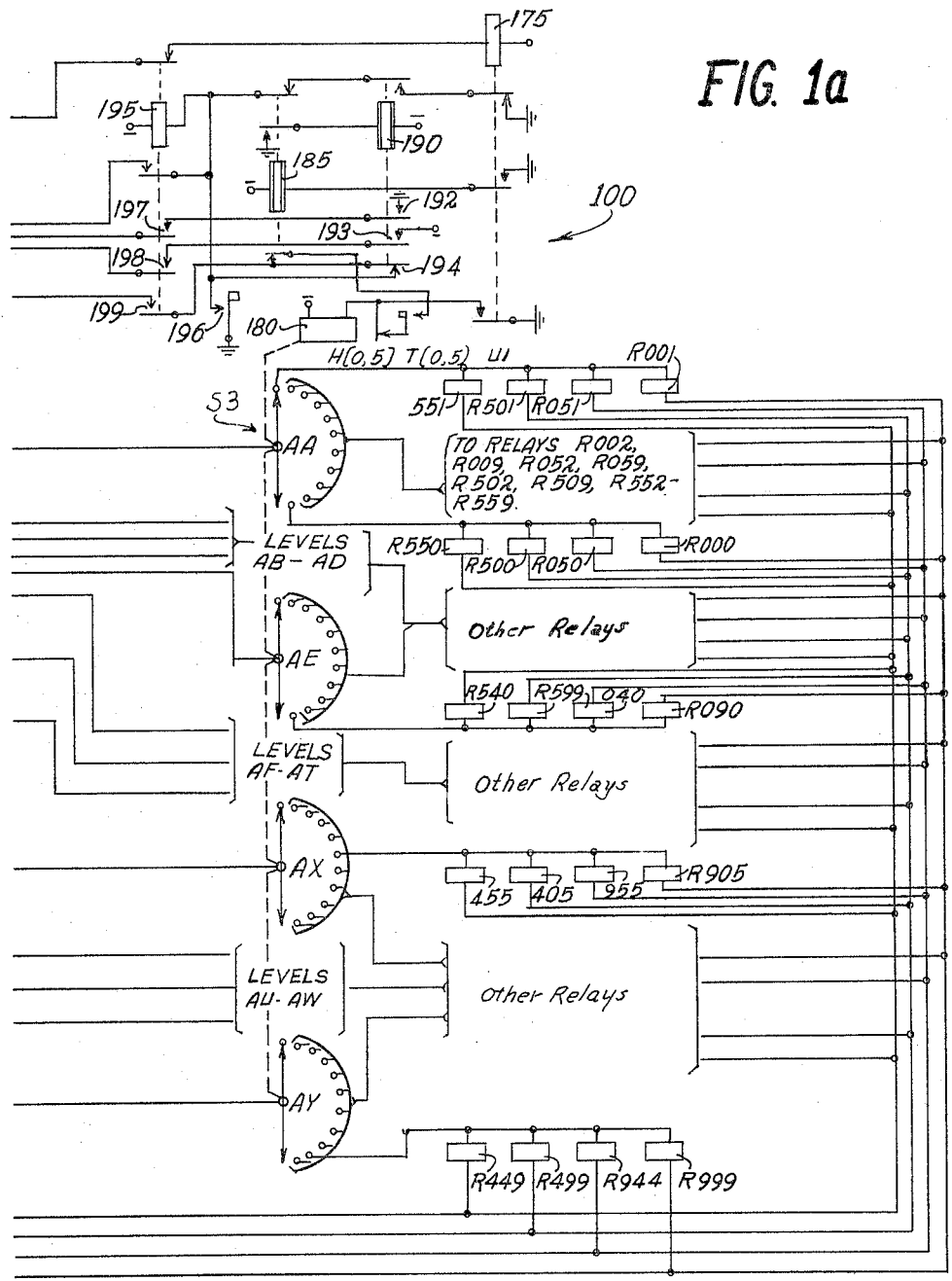

Referring now to FIGS. 1 and 1a there will be seen a simplified version of a selection system 100 employing the principles of the present invention. It comprises three stages 50, 60 and 70 each having a 10 point switch such as S1, S2 and S3.

The switches S1, S2 and S3 are stepped responsive to a respective series of impulses from the dial 101. Thus switch S1 is operated to a position corresponding to the number of impulses in the first series and therefore to the hundredths digit assigned to a particular outlet. Switch S2 is operated to a position corresponding to the number of impulses in the second series and therefore, to the tens digit assigned to a particular outlet, while switch S3 is operated to a position corresponding to the number of impulses in the third series and therefore to the units digit assigned to a particular outlet so that the three digits correspond to the number assigned to a desired outlet among 1000 outlets.

Each stage also has a respective impulse transfer relay such as relays 135 and 170 to permit the switches S2 and S3 in stages 50, 60 and 70 to be successively controlled responsive to a respective impulse series and the transfer relay 195 that extends a marking to the switch wipers at the end of the last series of impulses.

The type of impulsing control arrangement forms no part of the invention and is illustrated only for the purpose of showing one method or arrangement for successively operating the respective stages. Each switch S1, S2 and S3 is provided with a respective stepping magnet 120, 145 and 180 which are arranged in any well known manner to step the respective switch wipers to a position corresponding to the number of received impulses in a respective series. The magnets may be arranged to step the respective wipers on either energization or de-energization, however, since the manner of stepping also forms no part of the invention and as such arrangements are well known, the pawl and ratchet stepping mechanisms are not illustrated, although the stepping magnets will be hereinafter described as stepping the switch wipers on de-energization as is conventional.

The switch S1 in stage 50 comprises a two level switch of which level A extends a marking or potential individual to two alternative digits, while level B extends a marking individual to two alternative groups of digits each group including only one of the two alternative digits. The marking from level A is extended to one wiper of the first five levels A1–A5 of switch S2, while the marking from level B is extended to one wiper of the two group selection levels B1 or B2 of switch S2. Levels A1–A5 each individually correspond to a different two alternative hundredths digits while levels B1 and B2 each individually correspond to a different one of the groups selected by the wiper of level B. The marking from the level A of switch S1 is then extended past one of the levels A1–A5 of switch S2 to one of 25 levels AA–AY of switch S3 and the marking from switch S1 level B is extended past either levels B1 or B2.

It will thus be seen that switch S1, which is stepped in accordance with the first received impulse series, extends a marking indicidual to two alternative hundredths digits. Switch S2, which is stepped in accordance with the second received impulse series, extends that marking to a lead individual to the two hundredths digits and two alternative tens digits. Switch S3 then extends the marking to a lead individual to the combined alternative hundredths and tens digits and the units digit corresponding to the position to which switch S3 is operated. In the meantime switch S1 level B has extended a marking corresponding to one group of hundredths digits and that marking is extended by either levels B1 or B2 to a lead individual to that hundredths group and a tens group corresponding to the position to which switch S2 is stepped.

Each lead extending from the respective bank contacts of the various levels of AA–AY of switch S3 therefore each correspond to two possible hundredths digits, two possible tens digits and a particular units digit. Each lead therefore represents four different possible output points or outlets and since switch S3 has 25 levels of ten contacts each or 250 outlets, each of these outlets is connected to a respective four output devices among a total of 1000 different output devices represented by relays R000–R999.

Since the marking from level A of switch S1 has been extended to only 4 of the 1000 possible output devices, the problem then becomes one of selecting one of the four. This is done by means of the marking extended by levels B and B1 or B2. Thus level B has in effect made a selection of the hundredths digit by selecting one of two alternative groups of five digits 1–5 or 6–0 and level B1 or B2 have further marked one lead among four, that lead being individual to the dialed hundredths and tens digit group. This marking is extended to a corresponding one of the four output devices in each group. Since only one group of four output devices has a marking extended thereto from one of levels AA–AY, only the one output device or relay in that group or among the 1000 is operated.

Assuming now that it is desired to operate the selection system 100 shown in FIGS. 1 and 1a to select one of a 1000 output devices such as one of the relays R000–R999, the dial indicated at 101 is operated. As the dial turns off normal, contacts 111 close to complete a circuit through the dial contacts 112 and contacts 137 to the line relay 115 associated with the first switch S1. Relay 115 energizes to close contacts 116 for energizing the stepping magnet 120. The magnet 120 is energized, however, it doesn't step the switch S1, until denergized, in any well known manner. At contacts 117 slow-to-release relay 125 is energized, and at contacts 118 a possible circuit to the switch-through relay 135 is opened. Relay 125 completes a circuit to slow-to-release relay 130 at contacts 127 and that relay energizes to prepare a circuit to relay 135 at contacts 131. At contacts 126 relay 125 also opens another point in the circuit to relay 135.

The dial 101 is released in a conventional manner and during its return to normal, the dial springs 112 open and close a number of times dependent on the position to which the dial was operated all in any well known manner. The circuit to relay 115 is therefore opened each time contacts 112 open so that relay 115 follows the dial pulses to operate contacts 116 accordingly. The stepping magnet 120 therefore steps switch S1 to a position corresponding to the number of impulses transmitted by the dial so that the switch wipers are positioned in accordance with the first or hundredths digit. As the switch S1 is stepped off normal, the off normal spring 139 and 139' close to prepare holding and homing circuits to relay 135 and magnet 120 respectively. Contacts 118 close on each release of relay 115, but contacts 126 remain open as relay 125 is slow-to-release and therefore it remains operated throughout the transmission of the first series of pulses.

As the dial returns to normal, contacts 111 open to restore relay 115. During the interdigital pause ensuing after the first series of impulses, relay 125 restores as contacts 117 remain open. Relay 125 therefore closes contacts 126 to complete a circuit over contacts 118 and 118 to energize relay 135 over contacts 118, 131 and 126. As relay 125 restores it also opens contacts 127 to restore relay 130, but as that relay is also slow-to-release it remains operated long enough to ensure the operation of relay 135.

Relay 135 locks operated over contacts 138 and the off-normal springs 139. The off-normal springs 139 and 139' are operated responsive to the switch S2 being stepped off-normal in a conventional manner and they remain operated as long as the switch S2 is off-normal. The off-normal springs 139' prepare a homing circuit for the stepping magnet 120 which is completed when the dial sequence is terminated, as will be explained. In the meantime relay 135 opens contacts 137 to prevent the completion of a circuit to relay 115 on the next or succeeding dial operation and at contacts 136 prepares a circuit to line relay 140.

The succeeding or second operation of dial 101 therefore pulses relay 140 over contacts 111, 112, 136 and 172 in accordance with the desired number of impulses to be registered, and it in turn operates the stepping magnet 145 in an explained manner. Magnet 145 steps the associated switch S2 to a position corresponding to the number of received pulses as explained for switch S1 so that the wipers of switch S2 are now positioned in accordance with the second of tens digit. The slow-to-release relays 155 and 165 are controlled as explained for relays 125 and 130 respectively and at the end of the digital series, contacts 111 open to restore relay 140. This restores relays 155 and 165 while completing a circuit to the transfer or switch-through relay 170 in a manner explained for relays 125, 120 and 135. Relay 170 performs the same functions as relay 135 to open the incomplete circuit to relay 140 at contacts 172 and prepare a pulsing circuit over contacts 171 to the line relay 175 associated with the last stage 70. It also locks operated through the off-normal springs 179 associated with the second switch S2.

Thereafter the third series of dial impulses corresponding to the units digit are transmitted to relay 175 to operate that relay in a manner explained. It in turn operates relays 185 and 190 in an explained manner and pulses the stepping magnet 180, which steps the switch S3 to a position corresponding to the number of received impulses. At the end of the third series of impulses, relay 175 restores to restore relays 185 and 190 as explained for relay 115, 125 and 130 respectively. A circuit is therefore completed to relay 195 before relay 190 can restore.

Relay 195 on operating locks operated to the respective off-normal springs 196, 179 and 139 and at contacts 197 and 198 extends a ground and battery marking respectively to the wipers of levels B and A respectively of switch S1. The marking is only extended, until relay 190 restores to open contacts 192 and 193, however the selected output device is operated as will be explained before relay 190 restores.

When relay 190 restores, contacts 192 and 193 open, but the desired output device will have operated. At contacts 194 a homing circuit is completed from off-normal contacts 196, 179 and 139 to magnet 180 and over contacts 199 to the magnet 120 and 145 via their respective off-normal contacts. Each magnet now steps its respective wipers to their home position and the respective off-normal contacts open to terminate further stepping. As each switch is stepped home the grounds provided at the off-normal springs 139, 179 and 196 for holding the transfer relays 135, 170 and 195 operated are each removed. When all these grounds have been restored, the transfer relays 135, 170 and 195 restore to permit a succeeding group of digits to be received and registered.

Thus assuming the level A wiper of switch S1 has been operated to contacts 5 or 0 indicating the receipt of either 5 and 10 impulses, lead H(0.5) has battery extended thereo. Similarly if level A is in positions 1 or 6, lead H(1,6) is marked with battery, if in positions 2 or 7, lead H(2,7) is marked, if in positions 3 or 8, lead H(3,8) is marked and if in positions 4 or 9 lead H(4,9) is marked. The marking on lead H(0,5) is transmitted to the wiper of level A1, while if one of the other leads H(1,6), H(2,7), H(3,8) or H(4,9) is marked that marking is transmitted to a respective one of the levels A2–A5.

Switch S2 is of course stepped to a position corresponding to the received tens digit and each wiper connects to a lead corresponding to the two alternative tens digits (5,0) (1,6), (2,7), (3,8) or (4,9) depending on the position to which the switch is stepped. Since only one of levels A1–A5 has a marking extended thereto the lead selected by that level corresponds to both of the two alternative hundredths digits and two alternative tens digits as indicated in by the parenthesis in the drawings. There are therefore twenty-five different leads extending from the bank contacts of levels A1–A5 of switch S2 each corresponding to four different combinations of respective hundredths and tens digits. The marking extended to the selected lead from switch S2 levels A1–A5 is extended to a respective one of wipers of levels AA–AY, which extends the marking to a lead individual to the position to which switch S3 is operated. That lead, of course, corresponds to four combinations of hundredths and tens digits and one units digit.

Assuming therefore that leads H(0,5) was marked by the wiper of level A as a result of switch S1 being stepped to position 5. If switch S2 is stepped to position 0 or 5, lead H(0,5)T(0,5) is marked by the wiper of level A1 and level AA of switch S3 extends that marking to one of ten leads such as H(0,5)T(0,5)U1 for example. This lead extends to the four relays R001, R051, R501, and R551 assigned digits 001, 051 and 551 respectively. If lead H(0,5)T(0.5)UO is marked that marking is extended to relays R000, R050, R500 and R550. If the digits dialled were 999, for example, leads H(4,9) and H(4,9)T(4,9) extend the battery marking to the level AY wiper and it extends that marking to relays R999, R949, R499 and R449.

In the meantime the level B wiper of switch S1 is stepped to its first five positions if the dialled digit were 5 or less. This extends the ground marking over lead H(1–5) to level B1. If switch S2 is stepped only to one of its first five positions, lead H(1–5)T(1–5) is marked. If instead, switch S2 is stepped to one of its second five positions, lead H(1–5)T(6–0) is marked. Thus switch S2 may make a selection between leads H(1–5)T(1–5), H(1–5)T(6–0), H(6–0)T(1–5) or H(6–0)T(6–0) depending on the value of the hundredths and tens digit to select one relay in each group of four. Depending therefore on which of the latter leads is marked by ground and which group of four relays such as R001–R551, for example, are marked by battery from one of the levels AA–AY, one of those four relays is operated. In the same fashion if the dialled digit is 999 level B extends a marking from its second group of five contacts over lead H(6–0) to level B2 and that level extends the marking to lead H(6–0)T(6–0) and with the battery marking on relays R999, R949, R499 and R499, relay R999 is operated. Thus the described arrangement enables the selection of one among a 1000 possible positions with in effect 360 contacts exclusive of the contacts of the control circuitry; however, this arrangement is subject to considerable simplification and economy as will be explained.

Thus since two alternate contacts of the alternative digit selecting levels A, A1, etc., of the switches extend to a respective lead and each group of five contacts on the group selecting levels B, B1 and B2 extend to a respective lead each two alternate contacts may be replaced by a respective contact set and each group of five replaced by a single contact set. In such an arrangement the switch wipers and bank contacts are eliminated and cams such as diagrammatically illustrated in FIG. 2 are used in their stead.

Figure 2:
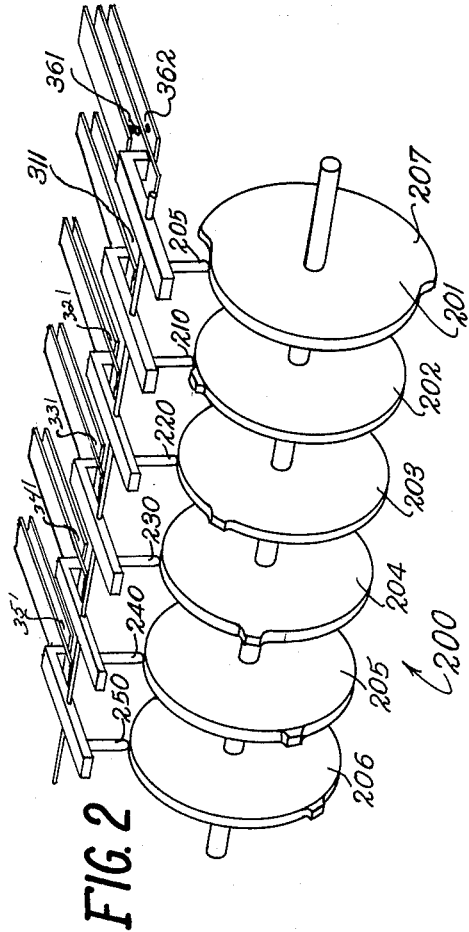
FIG. 2 illustrates one type of cam arrangement that may be used in place of the switches shown in FIG. 1.

Thus the cam arrangement 200 shown in FIG. 2 replaces the wipers and bank contacts of switch S1 and a similar cam arrangement is used in place of the wipers and bank contacts of switches S2 and S3 respectively so that the switches S1, S2 and S3 in stages 50, 60, and 70 respectively are each replaced by a cam arrangement such as 200.

The cam arrangement 200 comprises cams 201–206 with cam 201 having a lobe 207 arranged to operate an associated follwer arm 205, whenever the cam 201 is operated by an associated stepping magnet to a position corresponding to digits 6–0. This follower arm selects the group value (1–5) or (6–0) of the impulse series either through break contacts 361 or make contacts 362 respectively depending on the digit group. Cams 202–206 each have two lobes in respective positions 1 and 6, 2 and 7, 3 and 8, 4 and 9, and 5 and 0 respectively so that as these cams are stepped simultaneously to a position corresponding to the dialled digit, one of the cam lobes on one of the cams operates a respective one of the follower arms 210, 220, 230, 240 or 250 to close a respective set of contacts corresponding to two alternate digits. The cam arrangements replacing the other switches S2 and S3 operate respective follower arms in the same manner, however, the follower arm associated with the cams corresponding to 202–206 each operate five contacts in stage 60 and twenty-five contacts in stage 70. In addition the follower arm associated with the cam corresponding to 201 controls two make and two break contacts in stage 60 and four make and four break contacts in stage 70.

From the foregoing it is apparent that the cam arrangement 200 is operated to a position corresponding to the first dialled digit. In that position one of the respective follower arms 210, 220, 230, 240 or 250 is operated. The operated follower arm closes a respective one of the contacts 311, 321, 331, 341, or 351 shown in FIG. 3 with contacts 311 also illustrated in FIG. 2. The operated contacts correspond to two alternate digits and each extends over a respective lead to five different contacts such as 311a–351a shown in FIG. 3 and associated with the cam arrangement controlled by the second dialled digit. Thus the respective follower arms in the cam arrangement controlled by the second dialled digit, each controls five contacts such as 311a–311e in place of the one contact shown for arrangement 200.

In the meantime the follower arm 205 closes contacts 362 if the first dialled digit is 6–0 or leaves contacts 361 closed if the digit is 1–5. These contacts each extend to respective armatures of the group selection contacts 361a, 362a, 361b and 362b shown in FIG. 3 and which are controlled by the follower arm corresponding to 205 in the second stage 60.

The cam arrangement controlled by the second digit is similarly stepped in response to the second or tens digit to close one of the five groups of five contacts each, such as 311a–311e or 351a–351e depending on the position to which it is operated. Each contact in each group of five is multiplied to a different group of five contacts controlled by the cam arrangement stepped by the third or units digit so that the twenty-five contacts in stage 60 expands to 125 contacts in stage 70. The cam arrangement operated responsive to the second or tens digit also closes the group selection contacts 362a and 362b, if stepped to positions 6–0 or leaves the group selection contacts 361a and 361b closed, if in positions 1–5.

Similarly the cam arrangement controlled by the third or units dialled digit in stage 70 operates four group selection contacts 362aa–362dd, if in positions 6–0 or leaves four group selection contacts 361aa–361dd closed, if in positions 1–5. The other follower arms in stage 70 each control a respective group of 25 contacts such as 311aa–311ee or 351aa–351ee in the respective operated position so that a total of 125 outputs are provided with one contact of each group of twenty-five connected to a respective one of the 25 different outputs controlled by tens dialled digit in stage 60.

In stage 70 the box 320 represents the 20 contacts provided on expansion of contacts 321a–351a, boxes 330, 340 and 350 each represent twenty-five contacts expanded from a respective five contacts of a preceding portion of the contact tree and box 360 represents the 20 contacts resulting on the expansion of the tree from contacts 311e–341e under control of the second or tens digit. It will be obvious that if the contacts such as 351 each represent two alternative hundredths digits and are extended through the succeeding contacts such as 351e the extended connection corresponds to any combination of four digits. When extended through a third contact such as 351ee corresponding to two alternative unit digits, the outlet will represent any combination of the six digits in their respective order and therefore 2 to the 3rd power or eight possible combinations.

Therefore when a marking is extended to lead 301 at the termination of the dial sequence, that marking is extended past one of the contacts 311–351, depending on the dialled hundredths digit, to five different contacts such as 311a–351a. Five contacts such as 351a–351e are controlled by the dialled tens digit, but since only one in, for example, the group 311a–351a has the marking extended thereto, only the one contact in the latter group extends the marking to a respective group of five contacts such 311aa–351aa in stage 70. Since only one of the latter group of five contacts in stage 70 is closed along with 24 contacts in respective other groups responsive to the third or units dialled digit only that contact extends the marking.

Similarly to the arrangement for switches S1 and S2 a determination is also made of the hundredths and tens group value of the digit combination through the binary type marking extended from lead 302 either over contacts 361 or 362 and then either over contacts 361a, 361b, 362a or 362b with the eight contacts 361aa–362dd in stage 70 enabling the hundredths and tens group selection to be expanded to include a units group selection.

Thus one of the four leads of the binary contact tree are extended under control of the arm corresponding to 205 in the second stage to one of eight contacts 361aa–361dd or 362aa–362dd. Four of the contacts 361aa–361dd or 362aa–362dd are closed depending on the group value of the units digit to mark one of leads

H(6–0)T(6–0)U(6–0)—H(1–5)T(1–5)U(1–5)

which is individual to the hundredths, tens and units group value of the received digits in their respective order.

As already mentioned, in the third stage 70, the cam arrangement controlled by the third or units dialled digit operates a respective group of twenty-five contacts such as 311aa–311ee each corresponding to alternate units digits while an additional contact among the groups such as 361aa–361dd selects the digit group. Each of the twenty-five contacts controlled by a respective follower arm in stage 70 is, of course, connected to a different one of the twenty-five outputs from the second stage 60 and a total of 125 output or terminating connections is provided from the third stage 70. Since each of these 125 ultimate terminating connections thus corresponds to a respective alternate combination of two different hundredths, tens and units digits or a total of eight respective combinations, eight relays such as relays 111–666 or other output devices are connected to a respective one of these output leads

H(1,6)T(1,6)U(1,6)—H(5,0)T(5,0)U(5,0)

Each of the eight output devices is individual to one of the combinations. The total number is therefore 1000.

The marking extended by the group selection contacts such as 361, 362a and 362aa to lead

H(6–0)T(6–0)U(6–0)

for example, corresponds to one of the eight different combinations of hundredths, tens and units digit groups and the marking is applied to the respective one of the eight relays in each group, for example, relay 666. A circuit is then completed for operating only that relay among the eight. Thus the ground marking on one of leads

H(6–0)T(6–0)U(6–0)—H(1–5)T(1–5)U(1–5)

is extended to one relay in each group of eight or 125 relays, but since only one group of eight has a battery marking thereon only one circuit is completed and only one relay can operate.

As an example, if the first or hundredths digit dialled was 1 or 6, lead H(1–0) is marked responsive to the closure of contacts 311 and that lead extends towards contacts 311a–351a, each of which is associated with a different follower arm controlled by the second digit. If the second digit is also 1 or 6 the marking on lead H(1,6) is extended past contacts 311a to lead

H(1,6)T(1,6)

This lead also extends towards five contacts 311aa–351aa each associated with a different follower arm controlled by the third digit. If the last digit is also 1 or 6 the marking from contacts 311a is extended past contacts 311aa to lead H(1,6)T(1,6) and each of the eight relays 111, 116, 161, 166, 616, 661, 666. If each of the digits was 1 the contacts 361, 361b and 361dd are closed in sequence so that the marking on lead 302 is extended to lead H(1–5)T(1–5)U(1–5) which connects to one relay in each of the 125 different arrangements of eight relays. With a negative marking applied only to the eight relays 111–666 and a positive marking from lead H(1–5)T(1–5)U(1–5) applied to one relay in that group, only relay 111 operates.

Reiterating the substance of the foregoing it will be appreciated that any one of the contacts 311–351 depending on which of five different pairs of alternate hundreths digits is received extends a marking to one among five operated contacts in the following stage 60. Thus contacts 311 extend to contacts 311a–351a each corresponding to a different pair of tens digits, but only one of which is operated responsive to the receipt of one of the respective two alternate tens digits. Likewise contacts 321, 331, 341 and 351 each extends to five make contacts individual to different pairs of tens digits. Thus the second stage 60 extends the contact tree initiated at one of the contacts 311–351 through one of the five operated contacts among the twenty-five contacts controlled thereby. In addition the contacts 361 are connected through either contacts 361a or 362b or contacts 362 are connected through contacts 361a or 362a depending on the value of the first or hundredths digit and the value of the second or tens digit. Thus the contact tree extended through the second stage 60 from one of the contacts 311 corresponds to any one of the four combinations available from the two pair of alternate digits registered as a result of the first two dialled digits, while the binary contact tree extended from lead 302 extends to one of the four leads H(6–0)T(6–0)—H(1–5)T(1–5) individual to the hundredths and tens group of the dialled digits.

Lastly the contacts of the tree from the second stage 60 are extended to five make contacts each controlled by a different pair of alternate units digits. The output lead from the third stage such as H(1,6)T(1,6)U(1,6) instead of representing four combinations as explained for the arrangement in FIG. 1, represents eight combination of alternative digits. Since the third stage 70 is also provided with a binary group selection for the hundredths, tens and units group, the output on one of the leads H(1–5)T(1–5)U(1–5), for example, corresponds to one of the eight combinations of alternative digits instead of the four described in connection with the arrangement illustrated in FIG. 1. The total number of contacts to effectuate the selection exclusive of control circuitry is therefore reduced from the 360 illustrated in FIGS. 1 and 1a to 169 contacts. If desired, the switches S1 and S3 are altered to utilize 2 wipers five positions apart and a five contact bank in an obvious manner to achieve a result similar to cam arrangement 200. It will also be noted that the control circuitry may easily be altered to accommodate other sources besides a dial, such as coded punched cards.

At this time it will be noted that the arrangement is not limited to one wherein each pulse series is received in a successive order, but that the arrangement is capable of selecting an output device responsive simply to the receipt of sequentially received pulses with each corresponding to a different output device. Thus stage 70 is operated responsive to each received pulse and on receipt of the tenth pulse, for example, stage 60 is operated to its first position. Stage 70 is thus continuously stepped responsive to each received pulse and stage 60 stepped once for each ten steps of stage 70. Stage 50 in turn is stepped once for each ten steps of stage 60 so that it steps once for each 100 steps of stage 70. This is done either through a conventional gearing arrangement between the stages or by an electrical transfer arrangement which operates the stepping magnet of the succeeding stage after ten steps have been taken by the previous stage. Each stage is initially set in its zero position corresponding to the digit 5 or 0 with the group selection contact set to select the group value of 0. It will be noted that in this event the home positions of the respective stages are usually omitted. At the termination of the pulse sequence the respective alternative combination leads H(5,0)T(5,0)U(5,0)—H(4,9)T(4,9)U(4,9) and H(1–5)T(1–5) U (1–5) — H(6–0) T (6–0) U (6–0) are marked by either ground or battery respectively. Thus depending on the total number of received pulses the came arrangement of each stage is controlled to operate the corresponding contacts and extend the markings in a described manner for operating one relay among the 1000 that corresponds to the total number of received pulses.

In addition it will be noted that the described arrangement may be used advantageously in place of multiple level switches. Thus consider for example a 10 point stepping switch of 10 levels. In such a switch 100 contacts are provided. A switch wiper at each level is stepped responsive to pulses to place all the wipers at a corresponding position whereafter a circuit is extended from each level to a respective output device. Therefore contact 1, for example, at each level may be assigned respective numbers 1, 11, 21, 31–91, and other contacts assigned similar values. Now if positions corresponding to 1 and 6, 11 and 16, etc., are assigned to a common contact group which the number of contacts in the group correspond to the number of levels but are each common to two alternate digits and a selection made of the group value all the output devices corresponding to one position may be operated. Thus the cam arrangement 200 operates a number of contacts in each position corresponding to the number of levels. Therefore to replace the ten levels, it operates 10 different contacts in positions 1 or 6, 2 or 7, 3 or 8, 4 or 9 and 5 or 0 depending on the position to which it is operated. These are connected to respective output devices corresponding to either of those numbers. Since the cam arrangement operates one of two contacts to make a group selection, a selection of one group of output devices is made thereby, is an explained manner. It will thus be seen that a 10 contact 10 level switch may be effectively reduced from 100 contacts to 52 contacts and, of course, the principle is applicable to switches in which both the number of levels and the number of contacts per level differs from 10. Thus stage 70 illustrates in effect a 10 point 25 level switch with the contacts such as 311aa–311ee each corresponding to a different one of 25 different levels; and contacts such as 311aa–351aa corresponding to respective pairs of the digits 1 or 6—5 or 0 respectively, as explained. The group selection contacts in stage 70 are, of course, replaced by a pair of contacts such as 361 and 362 for selecting one of the alternate digits in an explained manner. Thus the described arrangement can be simply modified to provide the equivalent of a multiple level switch.

It will be appreciated that selections among numbers larger than a thousand may be made by adding additional stages differing from the previous in a manner similar to the difference between stages 60 and 70. It will also be appreciated that if power consumption is not a serious factor that the number of contacts may be further reduced in order to effectuate a selection, as will not be described.

Figure 4:
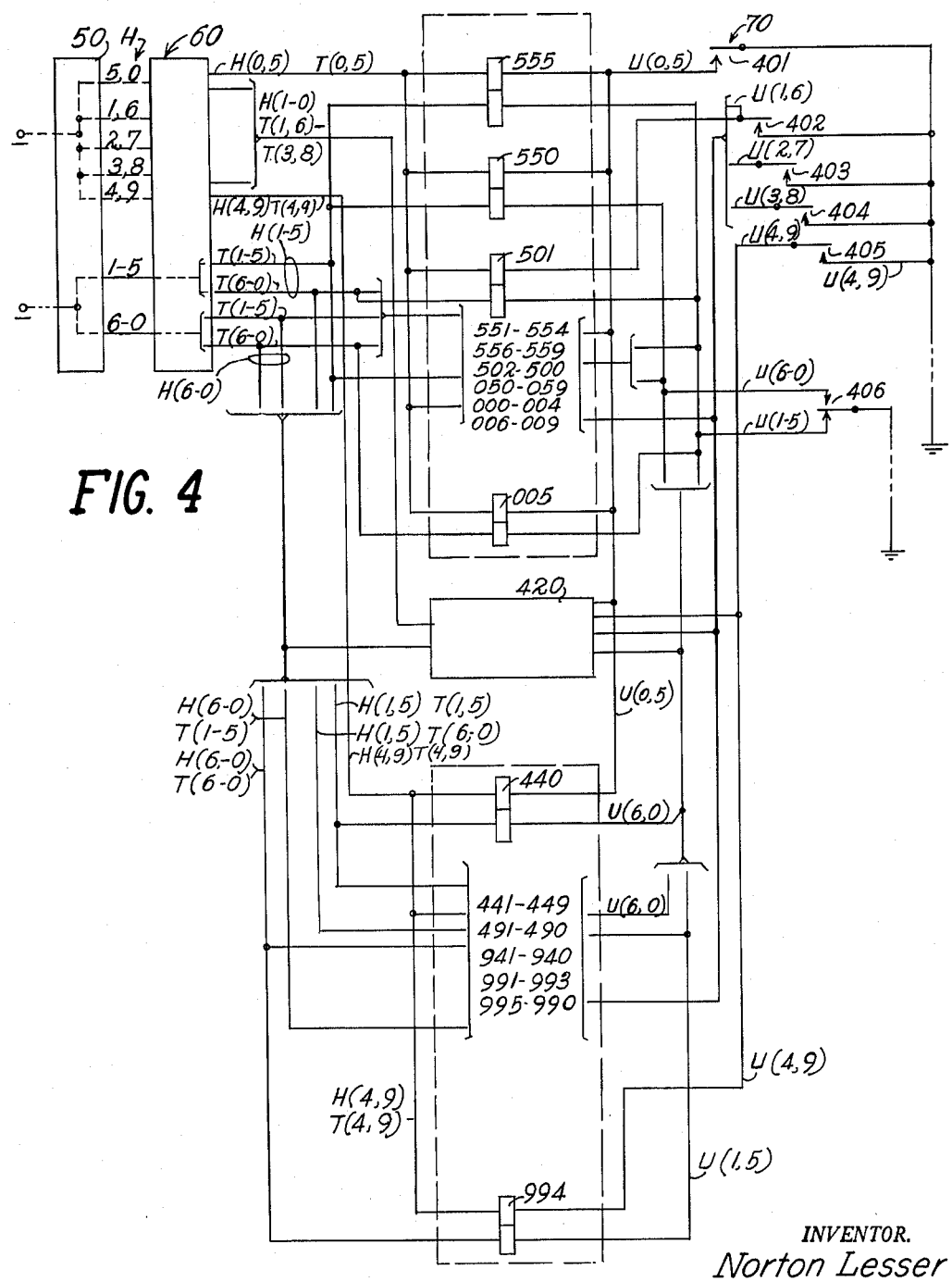
FIG. 4 illustrates another type of circuit arrangement that may be employed with the cams shown in FIG. 2.

Thus in FIG. 4 an arrangement for further reducing the number of required contacts is illustrated. In this arrangement the first two stages 50 and 60 are indicated by respective boxes and in each a cam arrangement such as 200 is operated responsive to a received hundredths and tens digit respectively to mark one of the 25 alternate combination output leads such as H(5,0)T(5,0) —H(4,9)T(4,0). Each of these leads corresponds to four different combinations of alternate hundredths and tens digits as already explained. In addition one of the four leads H(1–5)T(1–5)—H(6–0)T(6–0)corresponding to the respective hundredths and tens group value and one of the above alternate combinations is marked, all as explained.

The respective alternate combination leads such as H(0,5)T(0,5) are each extended to the upper winding of a respective group of 40 relays such as indicated by the broken lines around relays 555–005 and around relays 440–994 respectively with the remaining 920 relays indicated at box 420 so that a different 1000 output relays are provided.

Ten relays in each group of forty are assigned the same hundredths and tens digits and a different one of ten units digits. Thus the four alternate combinations of hundredths and tens digits are each divided into respective groups of ten and each relay in the ten is assigned a different one of the units digits.

The hundreds and tens groups selection leads H(1–5) T(1–5), etc., from stage 60 are each extended to the lower windings a respective group of ten relays in each group of 40. Thus the respective group selection leads enable the selection of a corresponding group of ten relays assigned values corresponding to the dialled hundreds and tens digits in any group of forty selected by the marked alternate combination lead.

The third stage 70, however, instead of utilizing 125 contacts and eight group selection contacts as described in connection with the arrangement in FIG. 3, is instead provided with only five contacts 401–405 and two group selection contacts 406 and 407. Stage 70 extends a marking to a respective lead U(5,0)—U(4,9) and either leads U(1–5) or U(6–0) depending on the value of the received units digit in a manner similar to that already explained. Thus the group selection contacts 406 or 407 mark one of the leads U(1–5) or U(6–0), depending on whether the units digit is five or above while one of the leads U(0,5)—U(4,9) is marked, if either one of the two digits corresponding to the lead are received. The alternate combination lead such as U(5,0) marked by the units digit is extended to the upper winding of each relay assigned one of the two alternate units digit in each sub group of ten relays among each group of forty.

Therefore, when the hundredths and tens alternative lead such as H(0,5)T(0,5) is marked with battery and the units alternative combination lead is such as U(0,5) marked by ground, the upper winding of eight relays in the respective group of forty relays assigned the hundredths and tens digit and either of the two units digits, energize. The relays cannot operate their contacts, however, unless the lower winding is also energized.

The circuit for the lower winding is provided by the battery marking on the hundredths and tens group lead such as H(1–5)T(1–5) extended through the lower winding of ten relays in each group of forty or a total of 250 relays to the ground extended from the respective units group lead such as U(1–5). The units group lead is connected to the lower winding of five hundred relays which have a corresponding units value including 125 of the 250 connected to lead H(1–5)T(1–5) so that 125 lower windings are energized. Thus eight lower windings in each group of forty relays assigned the hundreds, tens and units group value are energized. Since only one relay among the eight will have a circuit completed through both the upper and the lower winding and that relay is the one to which the marked hundredths and tens alternative lead and the marked alternative units lead was extended only that relay can close its contacts.

Assuming therefore that the digits 994 had been dialed so that leads H(4,9)T(4,9) and H(6-0)T(6-0) are marked by battery in accordance with the dialled hundredths and tens digits 99. Lead U(4,9) and U(1-5) are marked by ground in accordance with the dialled units digit 4 so that only relay 994 operates its contacts. On the other hand if digits 555 are dialled, leads H(0,5) T(0,5) and U(0,5) are marked to energize the upper winding of relay 555, while its lower winding is energized over leads H(1-5)T(1-5) and U(1-5). The necessity for completing multiple circuits can, of course, be avoided to a large extent if three element output devices such as transistors are used. In this manner the number of contacts for selecting one among a 1000 outputs can be reduced from the 169 described in connection with FIGS. 3 to 43. It will also be noted that if for example, only one among 100 selections is all that is needed, the stages 50 and 60 are arranged with only five alternate digit contacts each, plus two group selection contacts for each. This enables the operation of any device connected between the stages in a manner similar to that described.

The described manner in which registration and selection is accomplished is likewise applicable to electronic registering and/or selecting systems utilizing, for example, decade counters or shift registers. In such arrangement a number of stages corresponding to the number of digits to be registered are provided for each counter with each stage comprising some type of electronic valve arrangement such as a tube, transistor or magnetic core and attendant circuitry. Since the number of stages utilized in a decade counter, for example, is ten and since for each multiple of ten an additional ten stages must be provided, decade counters have not been received with the enthusiasm attended binary counters, which enable the registered count to be doubled with each succeeding stage despite the necessity for translating a binary count into decimal values. By utilizing principles heretofore described, however, the total number of stages necessary for decimal registration can be considerably reduced.

Thus in FIG. 5 a three stage registering system comprising stages 50, 60 and 70 is illustrated. Stage 50 comprises a decade counter H510 shown in block form for receiving and registering impulses corresponding to hundredths digits received over the lead 501. Stage 60 comprises a group of tens decade counters illustrated by blocks T510a–T510e for registering impulses corresponding to tens digits received over lead 502 and stage 70 comprises a single units counter illustrated by block U510 for registering pulses corresponding to units digits received over lead 503.

The respective decade counters H510 and T510a, etc., instead of comprising the usual ten stages are each provided with only five stages corresponding to digits 1,6; 2,7; 3,8; 4,9 and 5,0 respectively each capable of registering either of the respective alternate digits and marking a respective output lead such as leads H(5,0)—H(4,9) respectively. In addition the counters in respective stages 50, 60 and 70 are provided with respective memories or flip-flops FF1, FF2 and FF3 for registering group values and marking respective group value leads such as H(1-5) or H(6-0) respectively. The input leads 501, 502 and 503 are pulsed successively and apply those pulses through appropriate input circuitry, not shown. The pulses may be applied to each of the five stages, for example, in the associated counter to set the first stage 1,6 so that it marks its respective output lead. Each succeeding pulse causes the previously set stage to be returned to normal and a succeeding stage to be set all in a well known manner.

Thus pulses corresponding to a hundredths digit are received over lead 501 to advance the hundreds decade counter H510 through its various stages 1,6–5,0. On the sixth pulse the fifth stage or position 5,0 resets to set stage 1,6 and also operates the flip flop FF1 over lead HF. The flip flop FF1 had previously marked lead H(1-5) to indicate the group value of the received impulses as being from 1-5, but on being operated by the pulse over lead HF now marks lead H(6-0) to indicate the received and subsequent impulses are in group 6-0.

Thus any stage that has been set provides an output marking corresponding to two alternate hundredths digits over one of the leads H(1,6)—H(5,0). This marking is applied to a respective one of the And gates G1–G5 for permitting a respective one of the tens registers T510a–T510e to be advanced responsive to pulses corresponding to the tens digit received over the lead 502. Thus with an appropriate input at one of the And gates G1–G5 from one of the leads H(1,6)—H(5,0), that gate opens responsive to each pulse over lead 502 to advance the associated tens decade counter such as H510e, for example, over lead G5e.

Each of the tens decade counters is arranged in a manner similar to that described for H510 so that the output from any one of the five stages corresponds to two alternate tens digits, but since the selected tens decade counter T510e, for example, corresponds to two alternate hundredths digits 5 or 0 the marked output lead from that stage actually corresponds to four alternative hundredths and tens digit combinations in a manner already explained. In addition the operated counter controls the flip flop FF2 over lead TF to mark one of the leads T(1-5) or T(6-0) depending on whether the counter is operated past stage 5,0 or not. It will be appreciated, of course, that it is not necessary to provide five counters for the tens digits, but instead one counter and a series of gate circuits controlled by the set hundredths stage may be used in any well known manner. The illustrated arrangement however is believed to set forth the operation more simply.

Units counter U510 is operated similarly to the other decade counters and the output from any of its five stages provides a marking on a respective one of the leads U(1,6)—U(5,0) corresponding to a respective two alternate units digits. The setting of the flip-flop FF3 determines the group value 1-5 or 6-0 by marking one of the two group selection leads U(1-5) or U(6-0) accordingly in an explained manner.

The marking on the respective hundredths and tens group selection leads such as H(1-5) or H(6-0) and T(1-5) or T(5-0) are each applied to two And gates among four And gates G6–G9. Thus lead H(1-5) is connected to gates G6 and G8 to which respective leads T(1-5) and T(6-0) are connected, while lead H(6-0) is connected to gates G7 and G9 to which respective leads T(1-5) and T(6-0) are also connected. Therefore if leads H(1-5) and T(1-5) are marked, gate G6 provides an output corresponding to the corresponding group value of the hundredths and tens digit in a manner explained in connection with previously described figures.

Each of the other hundredth and tens group gates G7–G9 therefore provides an output corresponding to a different hundredths and tens group depending on the input on the respective hundredths and tens group value leads H(1-5) and T(6-0), etc. The output of each of the gates G6–G9 is extended to a respective pair of And gates among the group of gates G11–G18. One of the two units group leads U(1-5) or U(6-0) is connected to a respective one of each pair of gates among gates G11–G18. If gates G11 and G12 have been marked by an output from gate G6 and lead U(1-5) is marked by flip-flop FF3, the gate G11 is open to mark lead H(1–5)T(1–5)U(1–5). Thus each of the gates G11–G18 is opened by appropriate inputs to mark a corresponding one of the leads H(1–5)T(1–5)U(1–5) —H(6–0)T(6–0)U(6–0) to select a group value corresponding to the hundredths, tens and units digit as explained in connection with FIG. 3. This marking is extended to the respective base circuits of 125 different transistors assigned corresponding hundredths, tens and units group values. These transistors are arranged in groups of five each assigned a respective hundredths and tens value and a different one of five different units values. It will be understood, of course, that gates G6–G9 may be omitted and the respective hundreds and tens leads such as H(1–5), T(1–5), etc., connected directly to gates interconnected with the units leads U(1–5) or U(6–0) in any well known manner.

The marked alternative hundredths and tens combination lead such as H(1,6)T(1,6) is marked as explained by counters H510 and T510, if either the hundredths or tens digit is 1 or 6. The potential or lead H(1,6)T(1,6) is extended to the respective collector circuits of 40 transistors. Since there are four alternative hundredths and tens combinations corresponding to that marking, ten transistors in the group of forty are assigned respective ones of the four alternate hundredths and tens combinations as explained for the relays in FIG. 4. Other groups of forty transistors are also arranged in such groups of ten and assigned respective hundredths and tens values of the combination lead extended to the collector circuits of the forty. The units lead marked with the alternative digits is applied to the emitter circuit of two transistors in each sub group of ten each corresponding to a different one of the units digits combined with the respective hundredths and tens value in a manner explained in connection with FIG. 4.

The base circuit of one group of five of the ten transistors in each group of 40 is marked by the required hundredths, tens and units group value on one of the leads H(1–5)T(1–5)U(1–5)—H(6–0)T(6–0)U(6–0) extending from gates G11–G18 as explained. As only one of the transistors among the five has the proper potential applied to both its emitter and collector circuits only that transistor conducts or fires to mark its output lead accordingly. Thus if the respective digits 111 are registered by counters H510, T510a, and U510, leads H(1,6)T(1,6) and U(1,6) are marked to apply positive and negative potentials to the collector and emitter circuits of transistors 111–666 respectively. Gate G11 is opened to extend a negative potential to transistor T111 and that transistor conducts to mark output lead 111 accordingly. In this manner, which is similar to that explained for FIG. 4 with minor exceptions, one output device among a 1000 and assigned a number corresponding to received impulses is selected. After the selected output device is operated lead RS is energized to reset the counter L510 and T510a, etc., and the flip flops FF1, FF2 and FF3 to their initial condition all in any well known manner. It will also be appreciated that the counters may be reset to a home position or stage from which they are initially operated, as explained for the switches S1, etc.

The invention heretofore has been primarily described in arrangements wherein successive received impulses are registered to permit a selection, however, it is applicable to other types of registration arrangements. For example, in many registering or selecting systems the impulses may be received at respective counters in parallel that is without any particular time sequence. Thus in race track totalizers or similar arrangements such as those used for operating display boards, a pulse is applied to a respective units, tens or hundredths digit totalizing registration or counting arrangement in accordance with the needs of the system and each arrangement controls a respective display board. In such a system the respective totalizers represent multiples of the number of units registered in an adjacent totalizer and a carryover is usually provided from the units totalizer to the tens totalizer and from the tens totalizer to the hundredths, etc.

Figure 6:
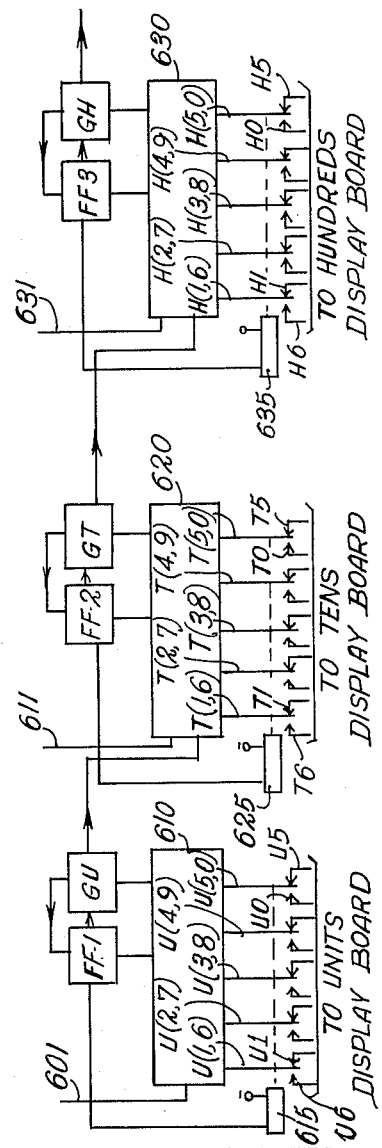
FIG. 6 illustrates another arrangement utilizing the principles of the present invention.

FIG. 6 illustrates one such totalizer arrangement in block form utilizing the principles of the invention. The block indicated at 610 typifies a units totalizer; the block indicated at 620 typifies a tens totalizer; and the block indicated at 630 typifies a hundredths totalizer. Each totalizer 610, 620 and 630 may comprise either a switch, relay counting chain, decimal electronic counter or shift register; however, instead of the usual 10 stage arrangement necessary to count to ten, only five need be provided, as explained, for example, in connection with FIG. 5.

Thus an input pulse is applied over lead 601 to the units totalizer 610 in any well known manner, whenever one unit is to be registered. An input pulse corresponding to ten units is applied over lead 611 to the tens register or totalizer 610 and a pulse corresponding to a hundred units is applied over lead 631 to the hundredths totalizer 630 in any well known manner whenever 100 units are to be registered. Each totalizer 610, 620 and 630 is thus advanced from a home position responsive to respective pulses on the corresponding leads 601, 611 or 631 to advance each totalizer by setting the respective stages therein in succession. Thus any set stage corresponds to the order of the last pulse applied to that totalizer and it marks a respective one of the leads U(1,6)—(4,9), T(1,6)—T(4,9) and H(1,6)—H(4,9). The marking is extended to respective ones of the leads U1–U5 or U6–U0, T1–T5 or T6–T0 and H1–H5 or H6,H0 depending on whether respective relays 615, 625 and 735 are operated or not. Each totalizer comprises only five stages which correspond respectively to the digits 1 or 6; 2 or 7; 3 or 8; 4 or 9; and 5 and 0 respectively so that the respective output leads such as U(1,6) also correspond to two alternate digits. The last stage corresponding to 5 or 0 is set in each totalizer after 5 or 10 impulses respectively have been received at the respective totalizer. Thus each totalizer marks a respective output lead such as H(1,6)—H(5,0), T(1,6)—T(5,0) and U(1,6)—U(5,0) depending on the set stage.

After five impulses have been received at the units totalizer, for example, the stage 5,0 is set and thereafter the sixth pulse is received to set stage 1,6 and reset stage 5,0. As stage 5,0 is reset on the sixth pulse the respective flip flop FF1, for example, is caused to change stage for applying an appropriate output to the And gate GU and to relay 615. The relay 615 operates to transfer leads U(1,6)—U(5,0) from leads U1–U5 which extend to corresponding unit output devices at the respective display board to leads U6–U0, which extend to other corresponding unit output devices. With lead U6 marked, the corresponding output device is operated, for example, to light a display board with a corresponding smybol. The other leads U1, etc., when marked, likewise permit corresponding symbols to be displayed. Then as the input pulses continue to be received at the units totalizer 610, other stages are set for marking respective output leads. When stage 5,0 is again set, a momentary pulse is extended to the gate GU and since the gate has been set by flip flop FF1, it passes a momentary pulse to the tens totalizer 620 to advance that totalizer one stage. Thereafter when another pulse is received at totalizer 610, stage 5,0 is reset for enabling the gate GU to again pass a momentary pulse, this time to flip flop FF1 to reset the flip flop. As flip flop FF1 resets, it restores relays 615, which now enables leads U1–U5 to be marked.

The tens totalizer 620 thus receives a carryover pulse from the units totalizer 610 each time ten units pulses are received at 610. It also receives pulses over lead 611 corresponding to ten units pulses. As each pulse is received, the tens totalizer 620 is advanced through the respective stages to mark one of the leads T1–T5 and when the sixth pulse is received flip flop FF2 is rendered effective to operate relay 625 and prepare And gate GT.

Leads T6–T0 will now be marked responsive to successive pulses and each may be arranged to control a display board to display a corresponding symbol. When totalizer 610 accumulates ten pulses it provides a carryover through gate GT to the hundredths counter or totalizer 630 to advance that counter one position and counter 630 may similarly advance a higher valued counter on accumulating ten pulses.

When the eleventh pulse is received at the tens counter or totalizer 620, stage 1,6 is again operated while stage 5,0 is reset. Gate GT then generates a momentary pulse to reset flip flop FF2 and release relay 615. The hundredths totalizer 630 is operated in a similar manner to mark respective output leads H1–H0 and may provide a carryover to a higher valued totalizer through gate GH in an explained manner, if desired. It will be understood, of course, that the particular description of the relays, gates or the flip flops together with the means for operating them is purely illustrative, as many techniques are available for providing the necessary operations on the required pulses to provide the selection of five of the ten output leads and the carryover respectively. Thus only five stages need be used in each of the totalizers or counters to provide output markings for operating devices corresponding to respective ones of any ten digits.

It will be appreciated, of course, that the described invention can be applied to any type of counting apparatus and is not limited to an arrangement in which the counts are registered in groups of ten or in digit orders limited to units, tens or hundredths, but may be applied in numerous different counting or selecting arrangements.

What I claim is:

1. A counting arrangement comprising a plurality of stages each operable in accordance with a successive series of received impulses to respective positions corresponding to the respective received impulses in each series, a lead connected to the first stage under control of each successive stage and corresponding to two different digits for each stage with one of each two different digits corresponding to a respective series of received impulses whereby said lead corresponds to a combination of digits equal to two raised to a power dependent on the number of stages, and a second lead connected to the first stage under control of each successive stage, said second lead common to a group of digits for each series with each group including a digit corresponding to the respective number of received impulses whereby a device individual to the number of impulses in each series in their respective order is operated by said leads.

2. A plural digit recording arrangement comprising means for registering a single marking corresponding to a plurality of digits for each digit order of a plural digit number, and means for registering a single marking corresponding to a group of digits for each digit order in said plural digit number with each group including only one of said plurality of digits for each digit order.

3. A plural digit registration arrangement comprising means for registering a marking corresponding to a plurality of alternate digits for each digit order of a plural digit number in a predetermined succession corresponding to the digit order, and means for registering a marking corresponding to a group of digits for each digit order with each group including only one of the alternate digits of the respective order.

4. A plural digit registration arrangement comprising means for registering one marking corresponding to a plurality of alternate digits for each of a plurality of digit orders, and means for registering one marking corresponding to a plurality of groups of digits for each of a plurality of digit orders with each group including only one of said alternate digits to thereby permit a selection of an output device assigned a plural digit number including one of each of said alternate numbers in a respective digit order.

References Cited by the Examiner

UNITED STATES PATENTS

| | | | |
|---|---|---|---|
| 1,469,809 | 10/1923 | Ray et al. | 179—17.6 |
| 1,967,331 | 7/1934 | Smith | 340—154 |
| 2,202,392 | 5/1940 | May et al. | 340—151 X |
| 2,391,469 | 12/1945 | Marshall et al. | 340—154 X |
| 2,428,811 | 10/1947 | Rajchman | 340—176 |
| 2,473,444 | 6/1949 | Rajchman | 340—166 |
| 2,645,764 | 7/1953 | McWhirter et al. | 340—172.5 |
| 2,688,738 | 9/1954 | Bellamy et al. | 340—147 |
| 2,769,968 | 11/1956 | Schulteis | 340—147 |
| 2,871,462 | 1/1959 | Eggensperger et al. | 340—334 X |
| 2,889,189 | 6/1959 | Cohen | 340—347.3 |
| 2,919,429 | 12/1959 | Hamilton et al. | 340—172.5 |
| 3,045,067 | 7/1962 | Nilsson et al. | 179—6 X |

NEIL C. READ, *Primary Examiner.*

STEPHEN W. CAPELLI, *Examiner.*

K. E. JACOBS, H. I. PITTS, *Assistant Examiners.*